US008824045B2

(12) United States Patent
Mino

(10) Patent No.: US 8,824,045 B2
(45) Date of Patent: Sep. 2, 2014

(54) OPTICAL AMPLIFIER CONTROL APPARATUS

(75) Inventor: Katsuyuki Mino, Tokyo (JP)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 13/401,062

(22) Filed: Feb. 21, 2012

(65) Prior Publication Data

US 2012/0218625 A1 Aug. 30, 2012

(30) Foreign Application Priority Data

Feb. 24, 2011 (JP) ................................ 2011-039034

(51) Int. Cl.
*H04B 10/12* (2006.01)
*H04B 10/17* (2006.01)
*H04J 14/00* (2006.01)

(52) U.S. Cl.
USPC ........................................ 359/341.32; 398/45

(58) Field of Classification Search
USPC ........................................ 398/45; 359/341.32
See application file for complete search history.

(56) References Cited

U.S. PATENT DOCUMENTS

| 5,241,414 | A | * | 8/1993 | Giles et al. ............... 359/341.33 |
| 5,367,587 | A | * | 11/1994 | Mizuochi et al. ............... 385/27 |
| 5,687,013 | A | * | 11/1997 | Henmi ........................... 398/167 |
| 6,809,846 | B2 | * | 10/2004 | Shimomura et al. ............ 359/16 |
| 6,885,825 | B2 | * | 4/2005 | DeGrange et al. .............. 398/83 |
| 6,904,241 | B2 | * | 6/2005 | DeGrange et al. .............. 398/83 |
| 7,197,246 | B2 | * | 3/2007 | Shimomura et al. ............ 398/83 |
| 7,460,298 | B2 | * | 12/2008 | Li et al. .................... 359/341.32 |
| 8,189,258 | B2 | * | 5/2012 | Rapp et al. ............... 359/341.33 |
| 2001/0008459 | A1 | * | 7/2001 | Ohshima et al. ......... 359/341.44 |
| 2003/0002143 | A1 | * | 1/2003 | Inoue et al. ................ 359/341.3 |
| 2004/0052526 | A1 | * | 3/2004 | Jones et al. ..................... 398/50 |
| 2004/0212875 | A1 | | 10/2004 | Li et al. |

FOREIGN PATENT DOCUMENTS

| JP | 04-234737 A | 8/1992 |
| JP | 05-218974 A | 8/1993 |
| JP | 11-121849 A | 4/1999 |
| JP | 2000-332330 A | 11/2000 |
| JP | 2001-148669 A | 5/2001 |
| JP | 2002-176218 A | 6/2002 |
| JP | 2003-086871 A | 3/2003 |
| JP | 2004-104473 A | 4/2004 |
| JP | 2006-084882 A | 3/2006 |

OTHER PUBLICATIONS

Japanese Office Action with partial English translation dated Jun. 3, 2014.

* cited by examiner

*Primary Examiner* — Eric Bolda
(74) *Attorney, Agent, or Firm* — McGinn IP Law Group, PLLC

(57) ABSTRACT

An optical amplifier control apparatus according to the present invention includes control circuit 300; optical amplifiers 4, 5 respectively located on paths; a plurality of light sources 200, 201 that output excitation lights that differ in light intensity; and optical switch 32 that changes optical routes of excitation lights that are output from light sources 200, 201 and inputs the excitation lights to optical amplifiers 4, 5 as determined by control circuit 300. Control circuit 300 is provided with determination section 301 that determines which paths to allocate which excitation lights that differ in light intensity based on a parameter that relates to wavelength lights on a plurality of paths when wavelength lights of WDM signal light that propagate to one of the plurality of paths are optically amplified.

15 Claims, 17 Drawing Sheets

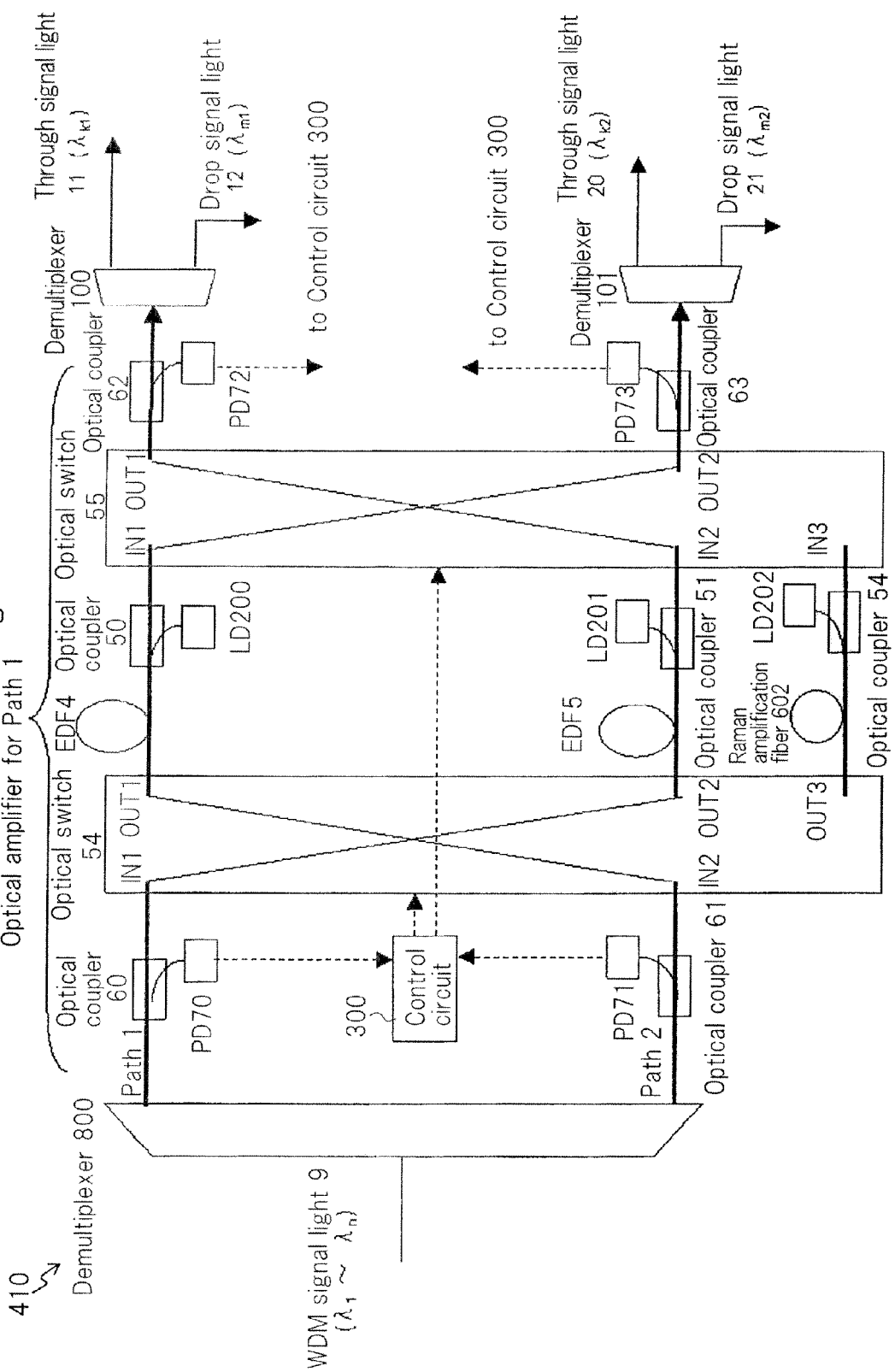

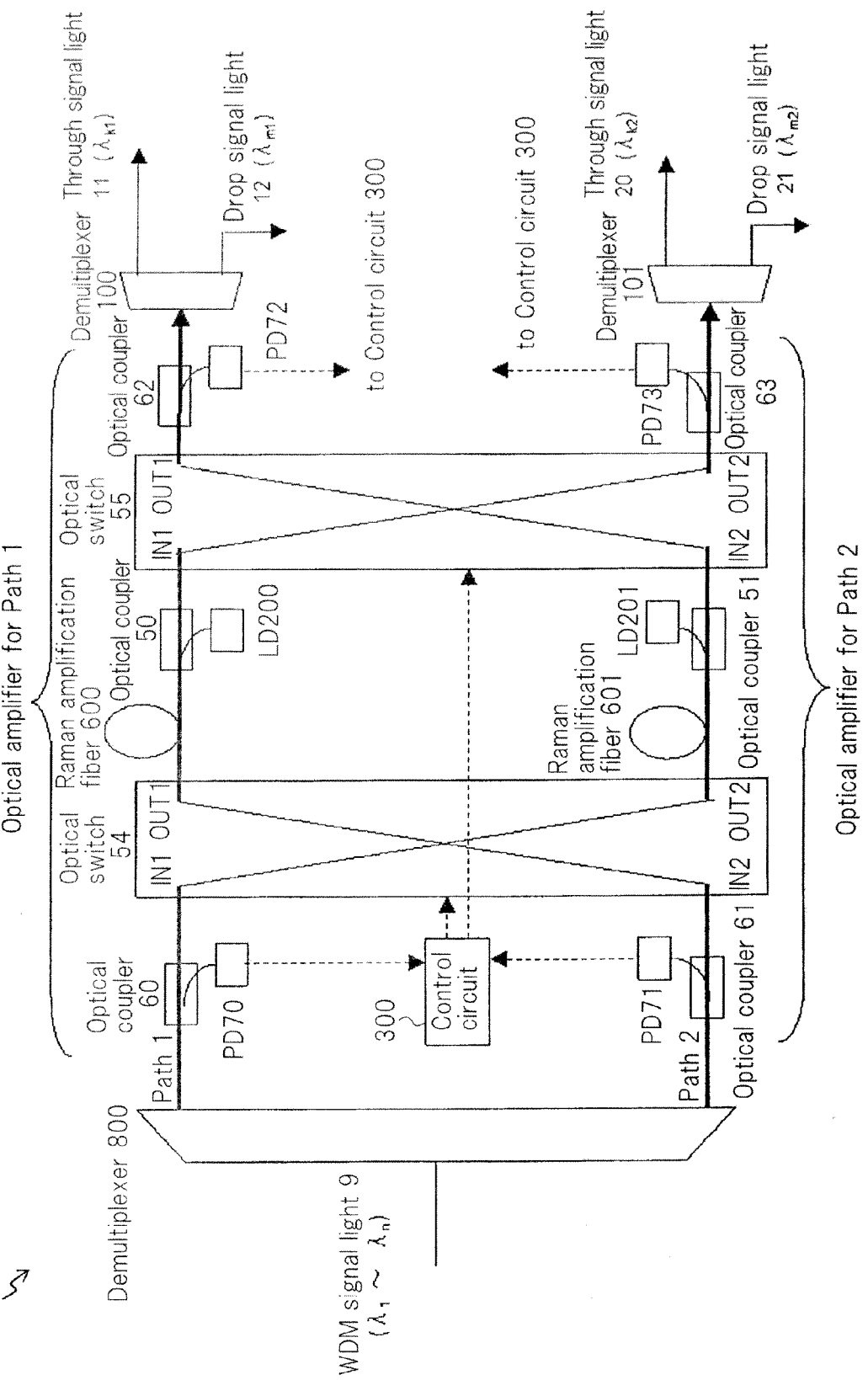

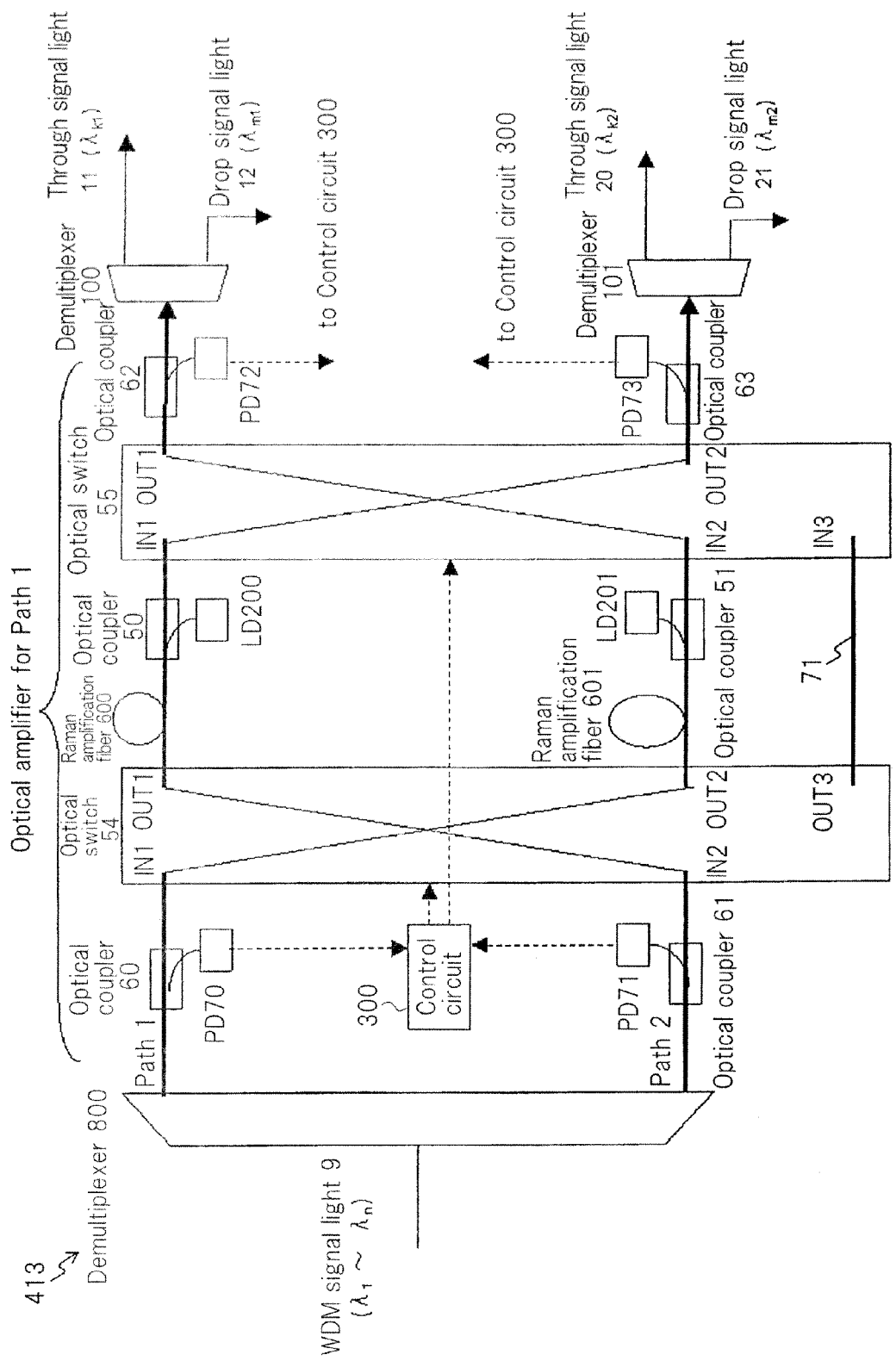

OPTICAL AMPLIFIER CONTROL APPARATUS

This application is based upon and claims the benefit of priority from Japanese patent application No. 2011-039034, filed on Feb. 24, 2011, the disclosure of which is incorporated herein in its entirety by reference.

BACKGROUND OF THE INVENTION

1. Field of the Invention

The present invention relates to an optical amplifier control apparatus that amplifies an optical signal using excitation light.

2. Description of the Related Art

In recent years, technologies such as OADM (Optical Add Drop Multiplexing) have been implemented for WDM (Wavelength Division Multiplexing) systems. OADM is becoming an essential technology especially for metro access networks that connect the user side and a backbone network. This means that by adding or dropping a desired wavelength to or from a wavelength multiplexed signal, the communication capacity can be changed depending on the user and thereby a network can be flexibly deployed.

FIG. 1 is an example of a drop configuration in this network. First, WDM signal light 9 is amplified by an optical amplifier in which erbium doped fiber (EDF) 3 is used for an amplifying medium. The amplifying medium is excited by laser diode (LD) 199 through optical coupler 59. Part of the WDM signal light that is input to EDF 3 is branched by optical coupler 69, photoelectrically converted by photo diode (PD) 78, and then input to control circuit 299. On the other hand, part of the WDM signal light that is output from EDF 3 is branched by optical coupler 69, photoelectrically converted by PD 79, and then input to control circuit 299. Control circuit 299 obtains an output control value of LD 199 corresponding to an optical amplification control scheme in use. For example, when a constant gain control scheme is implemented, control circuit 299 obtains an output control value for LD 199 such that input gain and output gain (the gains on the upstream and downstream sides of EDF 3) are constant.

The WDM signal light amplified by EDF 3 is demultiplexed into two parts by demultiplexer 99. Among them, necessary signal light is dropped as drop signal light 19. The other signal light passes through as through signal light 18.

FIG. 2 is an example of a drop configuration thought to be one candidate of the next generation drop configuration. In the configuration shown in FIG. 2, before WDM signal light 9 is amplified, it is demultiplexed into a plurality of paths by demultiplexer 799. FIG. 2 shows that WDM signal light 9 is demultiplexed into path 1 and path 2.

On path 1, optical coupler 66. PD 76, EDF 6, optical coupler 58, LD 198, optical coupler 67, PD 77, control circuit 298, and demultiplexer 98 are located. Their configuration is the same as that shown in FIG. 1. Demultiplexer 98 demultiplexes the WDM signal light amplified by EDF 6 into drop signal light 12 and through signal light 11.

On path 2, optical coupler 64, PD 74, EDF 7, optical coupler 57, LD 197, optical coupler 65. PD 75, control circuit 297, and demultiplexer 97 are located. Their structure is the same as that shown in FIG. 1. Demultiplexer 97 demultiplexes the WDM signal light amplified by EDF 7 into drop signal light 21 and through signal light 20.

In the configuration shown in FIG. 2, since a path can be selected together with the configuration shown in FIG. 1, a more flexible network than that of the configuration shown in FIG. 1 can be accomplished.

Examples of optical amplifiers that can be applied to the configurations shown in FIG. 1 and FIG. 2 are presented in Patent Literature 1 (JP2000-332330A, Publication) and Patent Literature 2 (JP2001-148669A, Publication).

An optical direct amplifier presented in Patent Literature 1 is composed of an optical amplification section, an excitation LD light source, a signal detector, and a control circuit. The optical direct amplifier presented in Patent Literature 1 operates in such a manner that when the number of channels of an input optically multiplexed signal is large, the number of excitation LD light sources is increased; when the number of signal channels decreases, the number of exciting LD light sources is decreased.

A wavelength multiplexed light repeater presented in Patent Literature 2 is composed of a plurality of optical transmission paths, excitation light sources, and EDFs. The wavelength multiplexed light repeater presented in Patent Literature 2 demultiplexes a WDM signal into signals with different wavelengths, optically amplifies them, and then multiplexes them.

Generally, optical amplifiers need to increase the output of an LD (light intensity of excitation light) corresponding to the number of input wavelengths of the WDM signal light. If the configuration shown in FIG. 2 is implemented, since it is likely that the entire WDM signal light is selected for path 1 or path 2, the LD on each path needs to output excitation light with light intensity that allows the entire WDM signal light to be amplified.

Thus, when the next generation drop configuration shown in FIG. 2 is implemented, since excitation light sources for optical amplifiers having the configurations presented in Patent Literatures 1 and 2 need to be located corresponding to the number of paths, a problem in which the cost rises in proportion to an increase of the number of paths arises.

SUMMARY OF THE INVENTION

Therefore, an object of the present invention is to provide an optical amplifier control apparatus whose cost is not proportional to an increase in the number of paths.

To accomplish the foregoing object, a control circuit according to the present invention includes a determination section that determines which paths to allocate which excitation lights that differ in light intensity based on a parameter about wavelength lights on a plurality of paths when said wavelength lights of WDM signal light that propagate to one of said plurality of paths are optically amplified.

To accomplish the foregoing object, a first optical amplifier control apparatus according to the present invention includes said control circuit, optical amplifiers respectively located on said paths, a plurality of light sources that output said excitation lights that differ in light intensity, and an optical switch that changes optical routes of said excitation lights that are output from said light sources and inputs the excitation lights to said optical amplifiers as determined by said control circuit.

To accomplish the foregoing object, a second optical amplifier control apparatus according to the present invention includes said control circuit, a plurality of light sources that output said excitation lights that differ in light intensity, optical amplifiers to which said excitation lights that are output from said light sources are input, and an optical switch that changes optical routes of said excitation lights on said paths and inputs the excitation lights to said optical amplifiers as determined by said control circuit.

To accomplish the foregoing object, an optical amplifier control method according to the present invention includes determining which paths to allocate which excitation lights that differ in light intensity based on a parameter that relates to wavelength lights on a plurality of paths when said wavelength lights of WDM signal light that propagate to one of said plurality of paths are optically amplified.

According to the present invention, an optical amplifier control apparatus whose cost is not proportional to an increase in the number of paths can be provided.

The above and other objects, features, and advantages of the present invention will become apparent from the following description with reference to the accompanying drawings which illustrate examples of the present invention.

BRIEF DESCRIPTION OF THE DRAWINGS

FIG. 15 is a schematic diagram describing an optical amplifier control apparatus according to the present invention;

FIG. 16 is a schematic diagram describing an optical amplifier control apparatus according to the present invention;

FIG. 17 is a schematic diagram describing an optical amplifier control apparatus according to the present invention.

DESCRIPTION OF THE PREFERRED EMBODIMENTS

Figure 1:
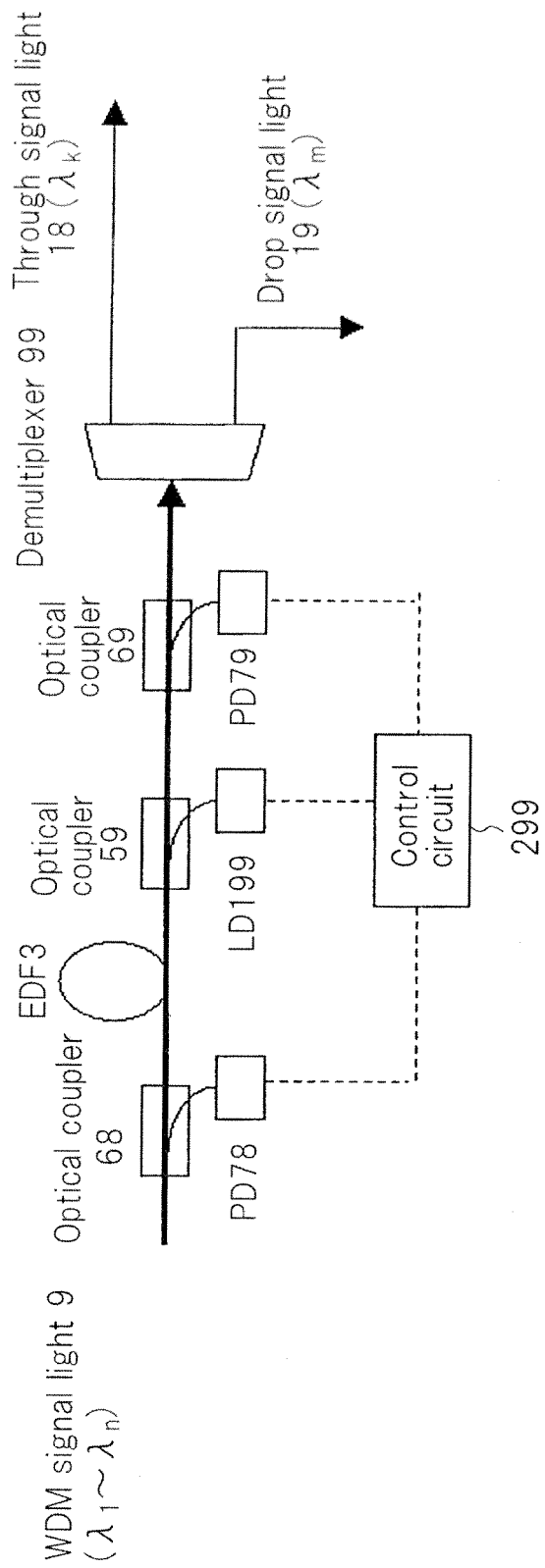
FIG. 1 is a schematic diagram describing a related drop configuration.

With reference to the accompanying drawings, embodiments of the present invention will be described. The embodiments described in the following are examples of the present invention and therefore the present invention is not limited to the following embodiments. In this specification and drawings, it should be noted that configurational components with identical reference numerals represent identical components.

Embodiment 1

Figure 3:
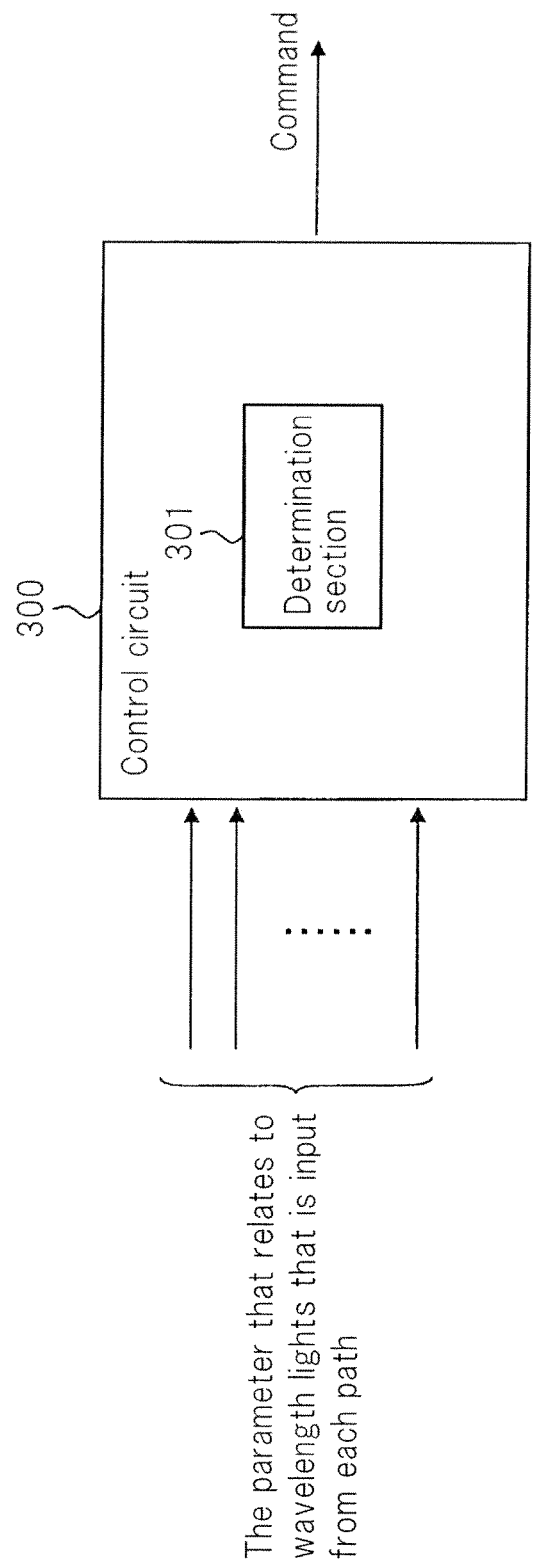
FIG. 3 is a schematic diagram describing a control circuit according to the present invention.

FIG. 3 is a schematic diagram describing control circuit 300 according to this embodiment. Control circuit 300 is provided with determination section 301 that determines which paths to allocate excitation lights that differ in light intensity corresponding to a parameter that relates to wavelength lights on individual paths when wavelength lights of a WDM signal light that propagate to a plurality of paths are optically amplified. In this case, the parameter that relates to wavelength lights is a parameter that relates to the number of wavelength lights and therefore it may be the number of wavelengths of wavelength lights or their light intensities.

Figure 4:
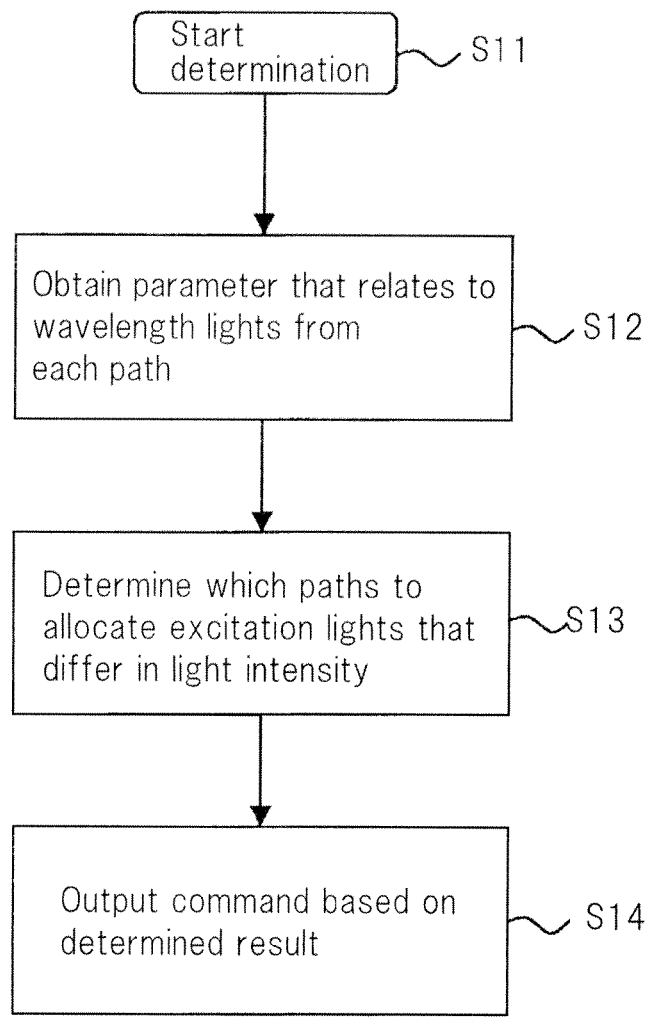
FIG. 4 is a schematic diagram describing an optical amplifier control method according to the present invention.

Control circuit 300 executes an optical amplifier control method as shown in FIG. 4. In other words, when wavelength lights of WDM signal light that propagate to any one of a plurality of paths are optically amplified, control circuit 300 starts a determination (at step S11). First, control circuit 300 obtains the parameter that relates to wavelength lights on individual paths (at step S12) and determines which paths to allocate excitation lights that differ in light intensity corresponding to the obtained parameter (at step S13). Thereafter, control circuit 300 causes an optical switch located on the downstream side thereof to change optical routes of excitation lights based on the determination result (at step S14).

Embodiment 2

Figure 5:
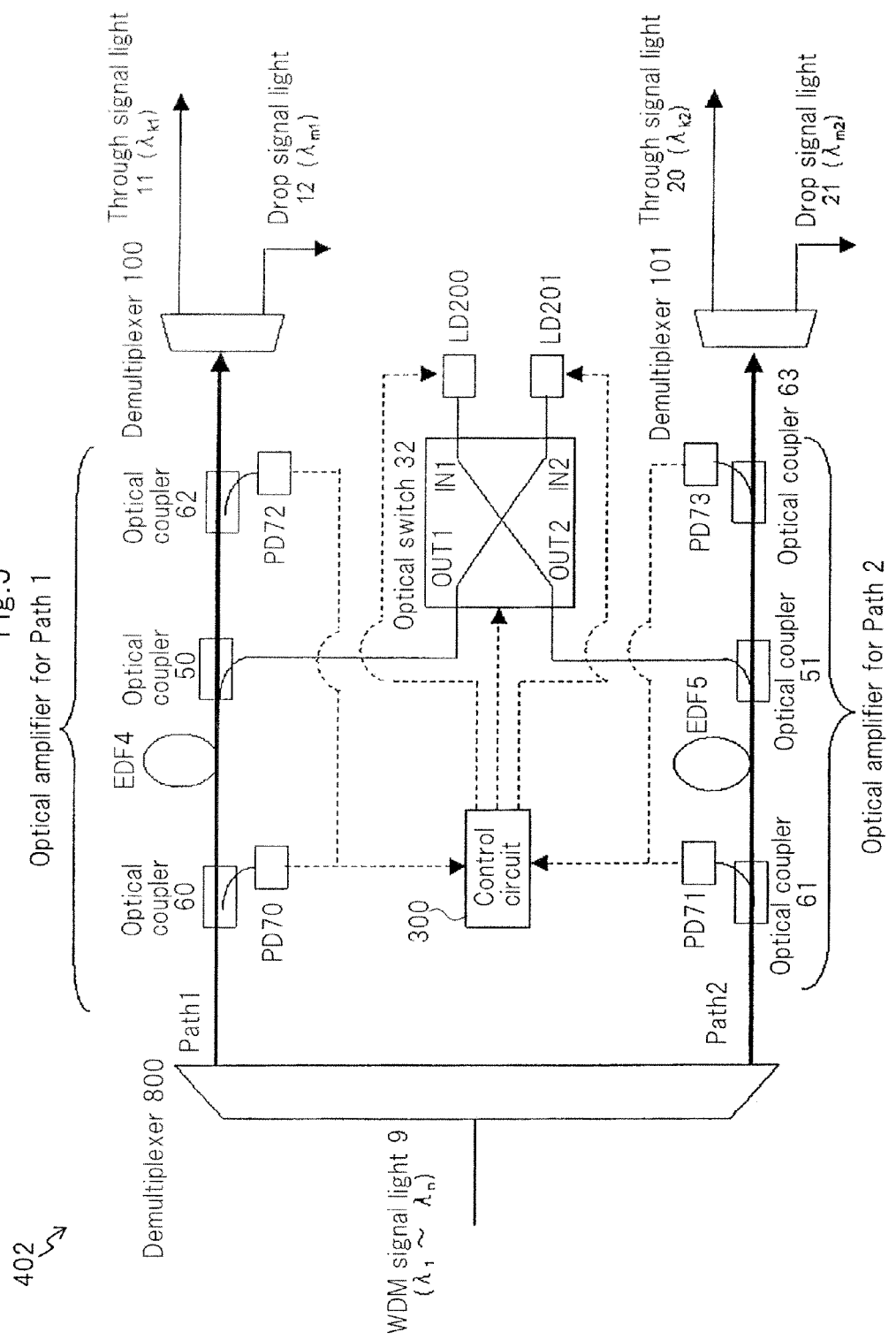
FIG. 5 is a schematic diagram describing an optical amplifier control apparatus according to the present invention.

FIG. 5 is a schematic diagram describing optical amplifier control apparatus 402 in which control circuit 300 is incorporated. The minimal configurational components of optical amplifier control apparatus 402 are control circuit 300, optical amplifiers 4 and 5 that are located on the individual paths, a plurality of light sources (LDs) 200 and 201 that output excitation lights that differ in light intensity, and optical switch 32 that changes optical routes of excitation lights that are output from light sources 200 and 201 and inputs the excitation lights to optical amplifiers 4 and 5. FIG. 5 concretely describes optical amplifier control apparatus 402 and thereby shows not only the minimal configurational components but also other components. According to this embodiment, optical amplifiers 4 and 5 are EDFs. Thus, hereinafter, the optical amplifiers will be described as EDFs 4 and 5. Although this embodiment shows that the number of paths is two, it should be noted that the number of paths is not limited to two.

Demultiplexer 800 is connected to optical coupler 60 and optical coupler 61. Optical coupler 60 is connected to EDF 4 and PD 70, whereas optical coupler 61 is connected to EDF 5 and PD 71. EDF 4 is connected to optical coupler 62 and optical switch 32 through optical coupler 50, whereas EDF 5 is connected optical coupler 63 and optical switch 32 through optical coupler 51. Optical switch 32 is connected to LD 200, LD 201, and control circuit 300. Control circuit 300 is connected to PD 70, PD 71, PD 72, and PD 73. Optical coupler 62 is connected to PD 72 and demultiplexer 100, whereas optical coupler 63 is connected to PD 73 and demultiplexer 101. In the drawing, solid lines represent optical connections, whereas dotted lines represent electrical connections.

With reference to FIG. 5, the operation of optical amplifier control apparatus 402 will be described. WDM signal light 9 is demultiplexed into wavelength lights that propagates to path 1 and path 2 by demultiplexer 800. Wavelength light demultiplexed into path 1 is partly branched and input to PD 70 for monitor light by optical coupler 60. Since the light intensity of the monitor light represents the number of wavelength lights that propagate to path 1, the monitor light is converted into an electronic signal by PD 70 and then the electric signal is sent to control circuit 300.

The non-monitor wavelength light is input to EDF 4 and then this wavelength light is coupled by optical coupler 50 to excitation light that is output from LD 200 or LD 201. Optical switch 32 selects an LD from which excitation light that is coupled is output. At this point, optical switch 32 selects an LD based on a command received from control circuit 300.

LD 200 can output light with light intensity that allows all wavelengths of WDM signal light 9 to be amplified. In contrast, LD 201 can output light with light intensity that allows a half of all wavelengths of WDM signal light 9 to be amplified.

Control circuit 300 selects LD 200 when the number of wavelength lights (number of wavelengths) on path 1 is equal to or greater than the half of the number of wavelengths of WDM signal light 9 or selects LD 201 otherwise based on the light intensity of the monitor light detected by PD 70.

$Er^{3+}$ ions (erbium ions) in EDF 4 are excited by excitation light that is output from LD 200 or LD 201 and wavelength light is amplified by the exited $Er^{3+}$ ions and then output.

Wavelength light that is output from EDF 4 is partly branched by optical coupler 62 for monitor light and then input to PD 72. PD 72 converts the branched wavelength light into an electric signal and sends it to control circuit 300. Control circuit 300 decides output control values of LD 200 and LD 201 based on an optical amplification control scheme. For example, when a constant gain control scheme is implemented, control circuit 300 obtains output control values of the LDs such that the input and output gains (the gains on the upstream and downstream sides of EDF 4) become constant.

As described above, wavelength light that is demultiplexed by demultiplexer 800 and that propagates to path 1 is amplified up to a desired output level by EDF 4 and then demultiplexed into drop signal light 12 and through signal light 11 by demultiplexer 100.

On the other hand, wavelength light that is demultiplexed by demultiplexer 800 and that propagates to path 2 is amplified in the same manner as described for path 1 and then demultiplexed into drop signal light 21 and through signal light 20 by demultiplexer 101.

Next, effects of this embodiment will be described.

Effect 1

Figure 2:
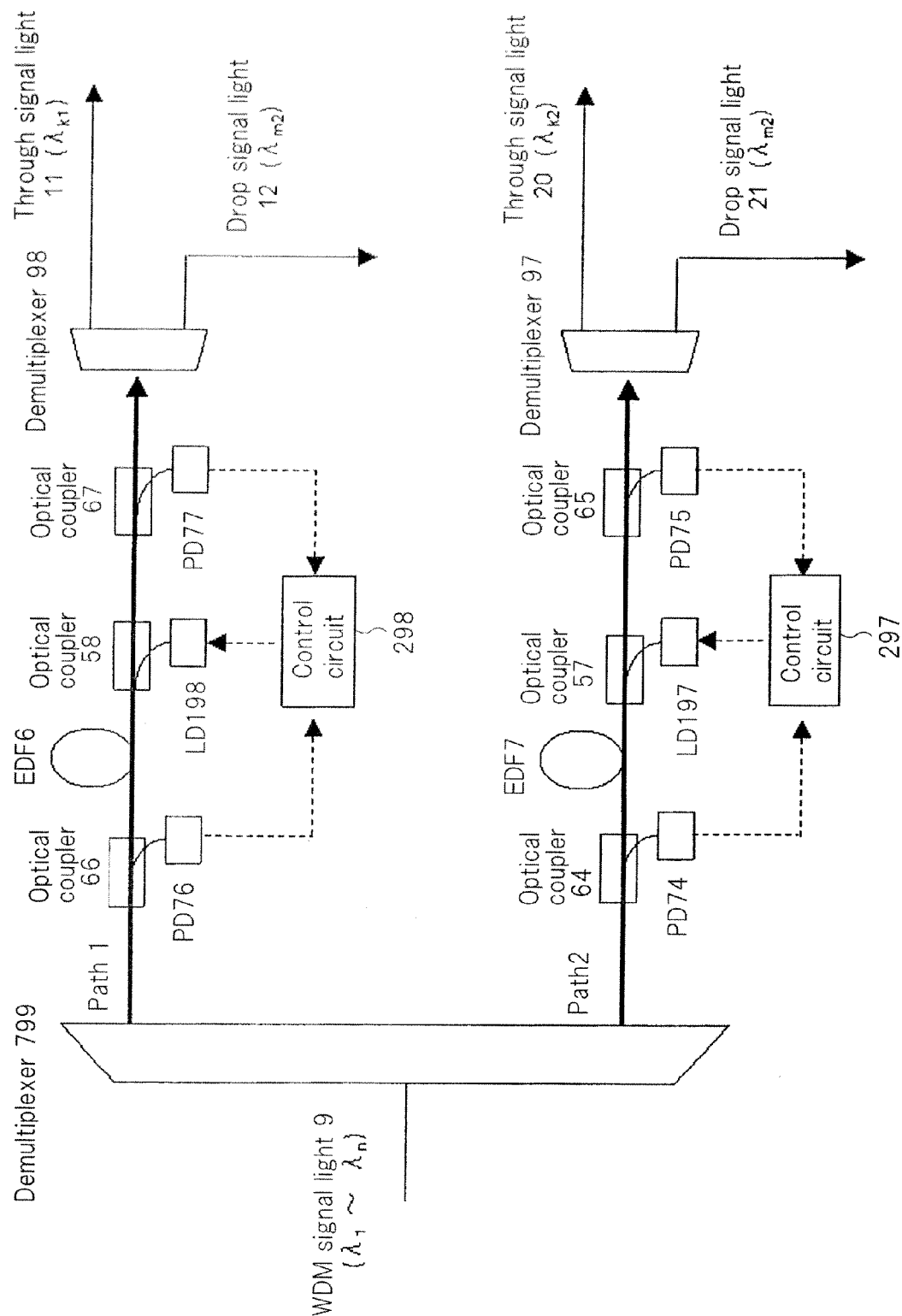
FIG. 2 is a schematic diagram describing a related drop configuration.

In the configuration shown in FIG. 2, LDs that output light with light intensity that allows all wavelengths contained in WDM signal light 9 to be amplified need to be provided on individual paths. In other words, in this case, necessary outputs of LDs increase in proportion to the number of wavelengths and thereby the cost of LDs rises.

In contrast, in the configuration according to this embodiment, since the output of an LD on one path can be the half of the output of an LD used for all wavelengths, the cost of one LD can be reduced.

Effect 2

The effect of cost reduction described in Effect 1 becomes strong in proportion to an increase of the number of paths. Here, the case in which the optical amplifier control apparatus has four paths will be described. Four LDs located in the optical amplifier control apparatus are as follows.

LD for all wavelengths of WDM signal light . . . 1 unit

LD for half of all wavelengths of WDM signal light . . . 1 unit

LD for one third of all wavelengths of WDM signal light . . . 1 unit

LD for one fourth of all wavelengths of WDM signal light . . . 1 unit

In the configuration shown in FIG. 2, four LDs for all wavelengths of WDM signal light are required. Thus, assuming that the cost of an LD for all wavelengths of WDM signal light is 1, the cost of LDs in the configuration shown in FIG. 2 will be 4.

Assuming that the attenuation amount of a wavelength is proportional to the cost, the cost of LDs of the entire apparatus according to the present invention becomes:

$$1 + \frac{1}{2} + \frac{1}{3} + \frac{1}{4} = \frac{25}{12}$$

Thus, it is clear that the cost can be remarkably reduced.

Embodiment 3

Effect 3

Figure 6:
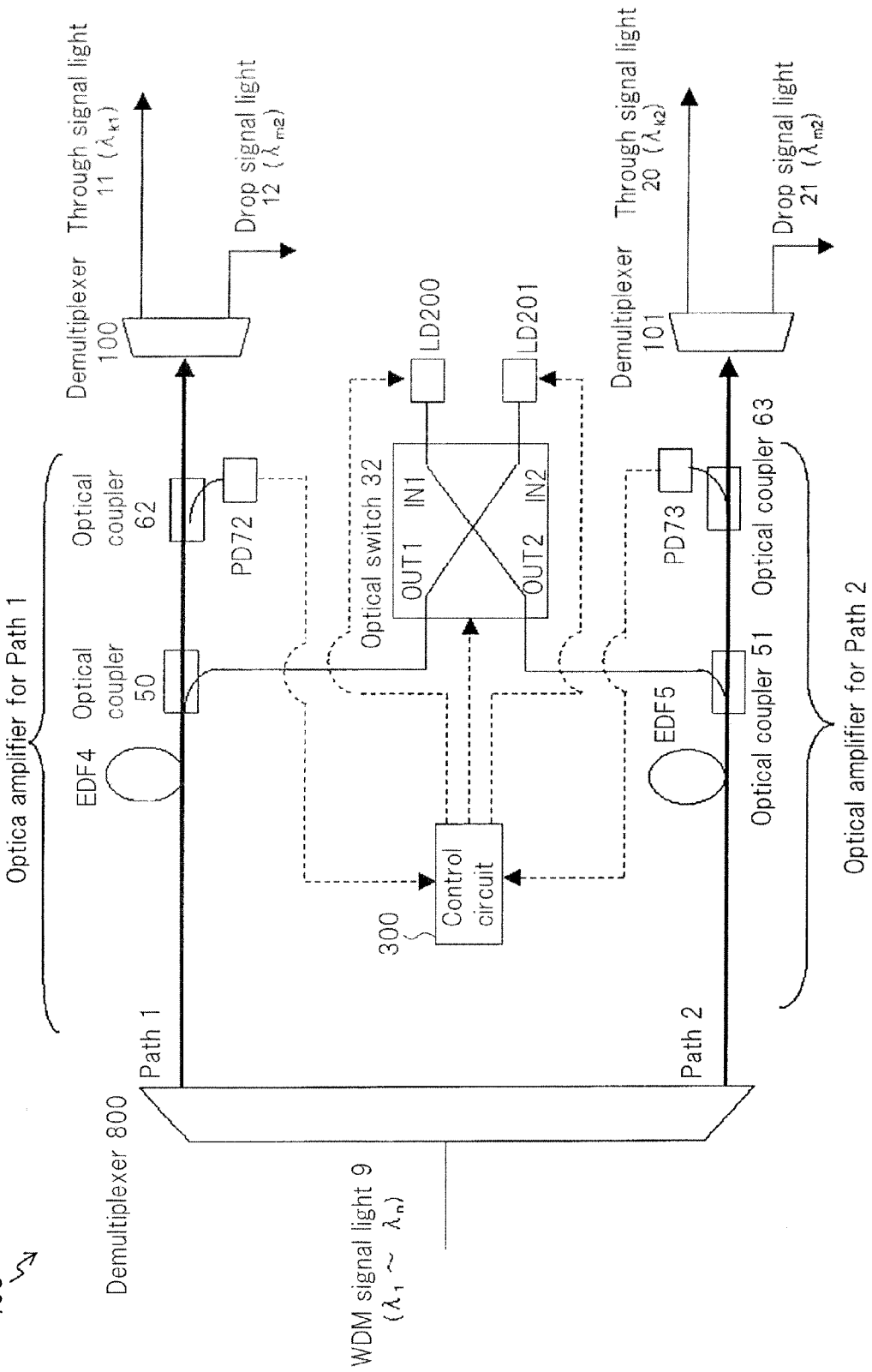
FIG. 6 is a schematic diagram describing an optical amplifier control apparatus according to the present invention.

FIG. 6 is a schematic diagram describing optical amplifier control apparatus 403 according to embodiment 3. Optical amplifier control apparatus 403 is different from optical amplifier control apparatus 402 shown in FIG. 5 in that wavelength light is not monitored on the upstream side of EDFs 4 and 5. The optical amplifier control apparatus 403 controls optical amplification based on for example an optical output constant control scheme. The configuration according to this embodiment can also obtain the foregoing Effect 1 and Effect 2.

Embodiment 4

Effect 4

Figure 7:
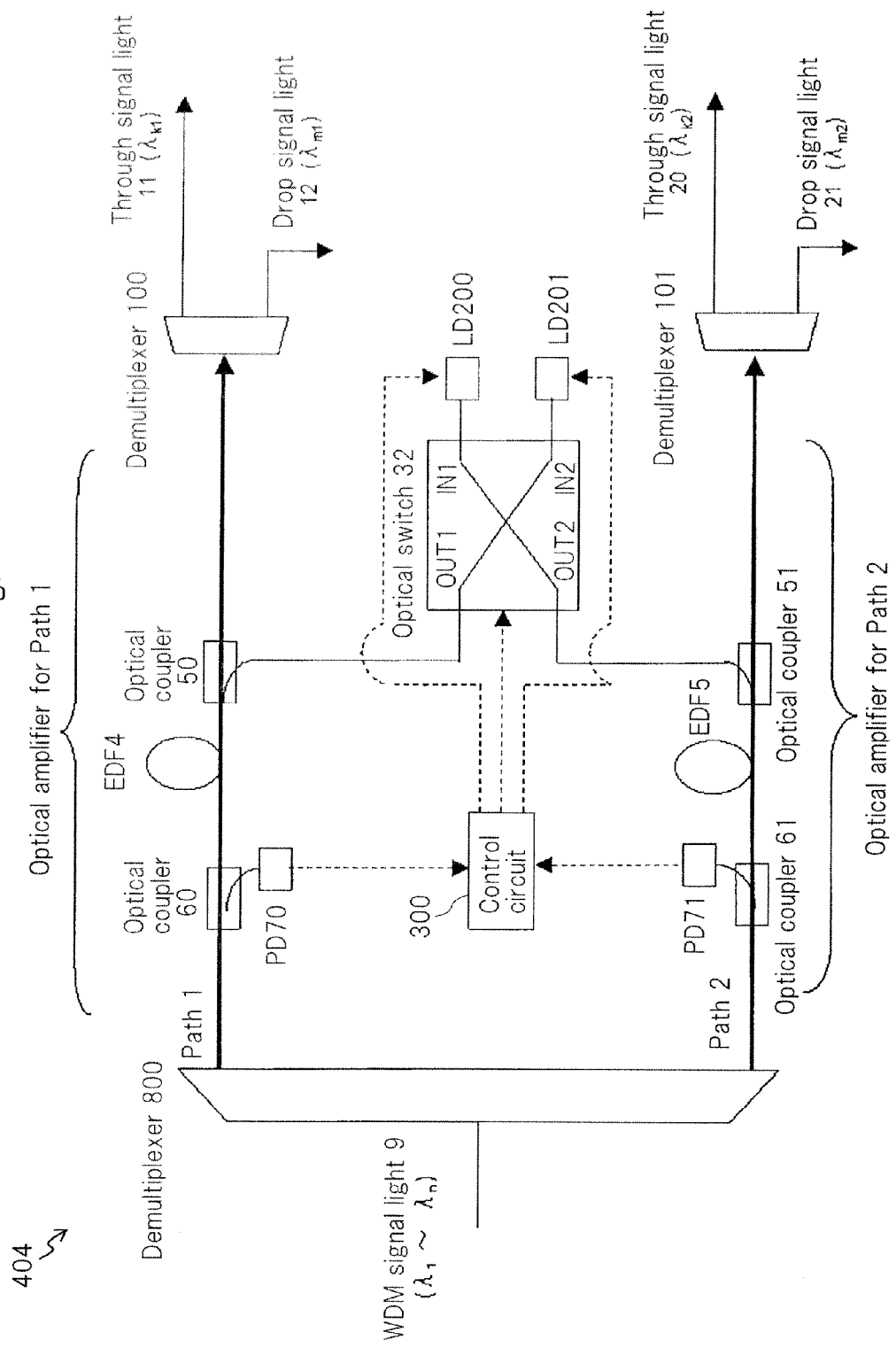
FIG. 7 is a schematic diagram describing an optical amplifier control apparatus according to the present invention.

FIG. 7 is a schematic diagram describing optical amplifier control apparatus 404 according to embodiment 4. Optical amplifier control apparatus 404 is different from optical amplifier control apparatus 402 in that wavelength light is not monitored on the downstream side of EDFs 4 and 5. Optical amplifier control apparatus 403 controls optical amplification based on for example a simplified gain constant control scheme (a scheme in which the output of an LD is adjusted in proportion to the input level). The configuration according to this embodiment can also obtain the foregoing Effect 1 and Effect 2.

Effect 5

The foregoing effects can be obtained not only by inputting excitation light on the downstream side of EDFs 4 and 5 like optical amplifier control apparatus 402, but also by inputting excitation light on the upstream side of EDFs 4 and 5.

Effect 6

Generally, EDFs have characteristics in which even if excitation light that is output from an LD is shut out, the excitation state of $Er^{3+}$ ions continues for a constant period (life time period). Thus, by operating optical switch 32 more quickly than the life time period of the excitation state of an EDF, paths of WDM signal light can be changed over without an instantaneous power interruption.

Embodiment 5

Effect 7

Figure 8:
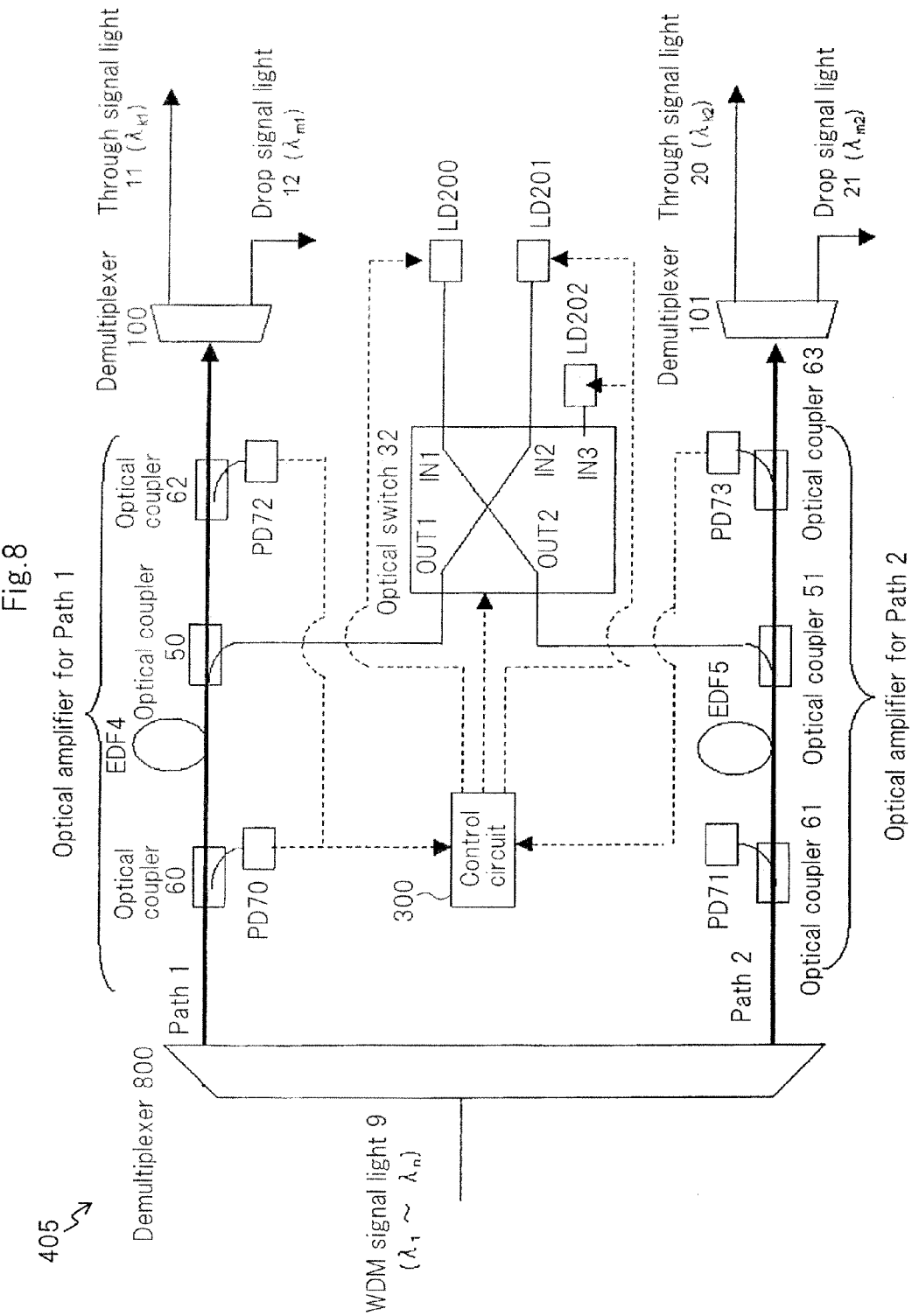
FIG. 8 is a schematic diagram describing an optical amplifier control apparatus according to the present invention.
Figure 9:
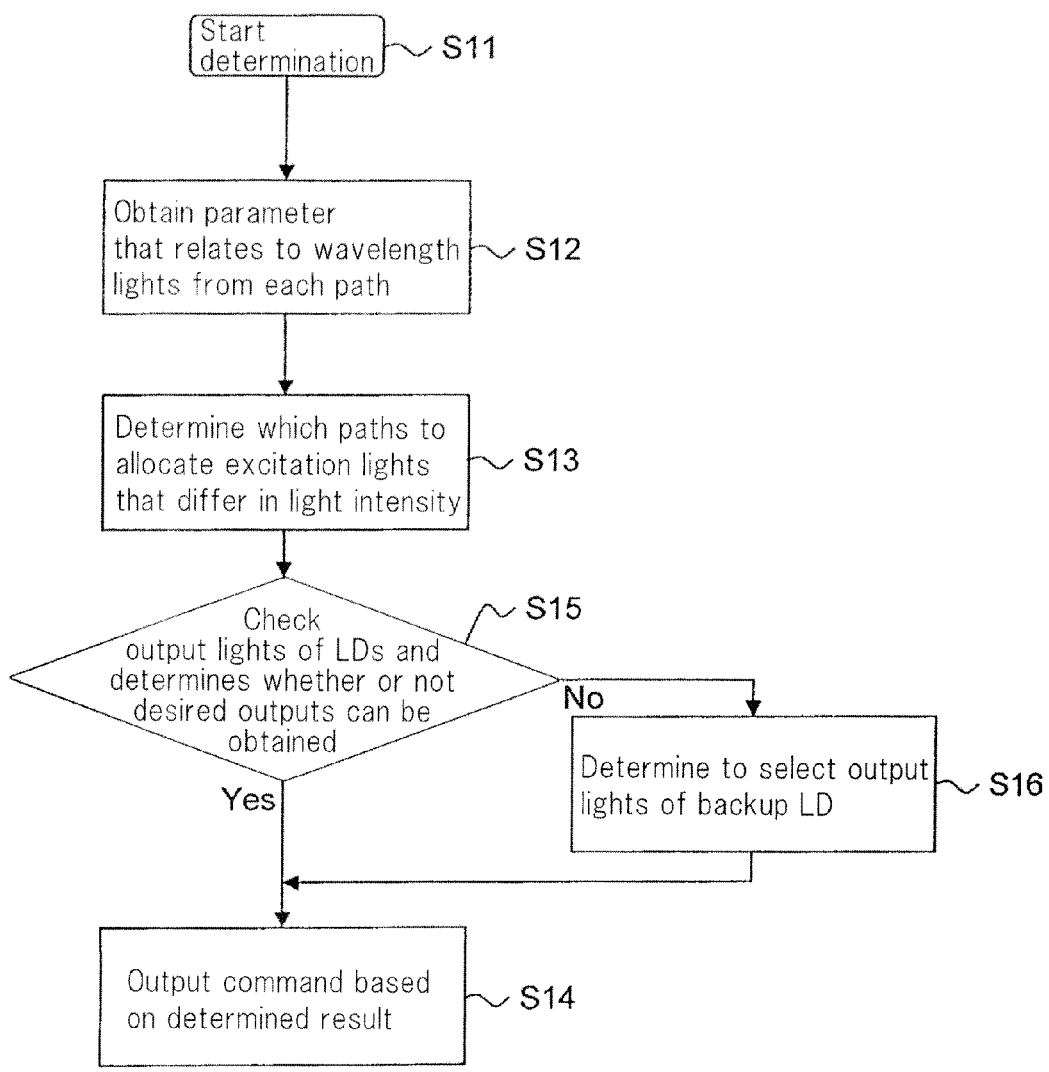
FIG. 9 is a schematic diagram describing an optical amplifier control method according to the present invention.

FIG. 8 is a schematic diagram describing optical amplifier control apparatus 405 according to embodiment 5. Optical amplifier control apparatus 405 is different from optical amplifier control apparatus 402 shown in FIG. 5 in that a backup LD port is located in optical switch 32 and backup LD 202 is connected to the port. Control circuit 300 of optical amplifier control apparatus 405 executes an optical amplifier control method as shown in FIG. 9. In other words, after step S13 described with reference to FIG. 4, control circuit 300 checks output lights of LDs and checks whether or not a desired output is obtained (at step S15). If excitation light has not reached necessary light intensity that allows wavelength light on the path to be amplified, control circuit 300 determines that backup excitation light will be used to optically amplify wavelength light on the path (at step S16). LD 202 that outputs backup excitation light serves for all wavelengths of WDM signal light. Even if LD 200 or LD 201 deteriorates or breaks down in optical amplifier control apparatus 405, since wavelength light can be optically amplified until the LD is replaced with a good one, the quality of optical amplifier control apparatus 405 can be improved.

Embodiment 6

Effect 8

Figure 10:
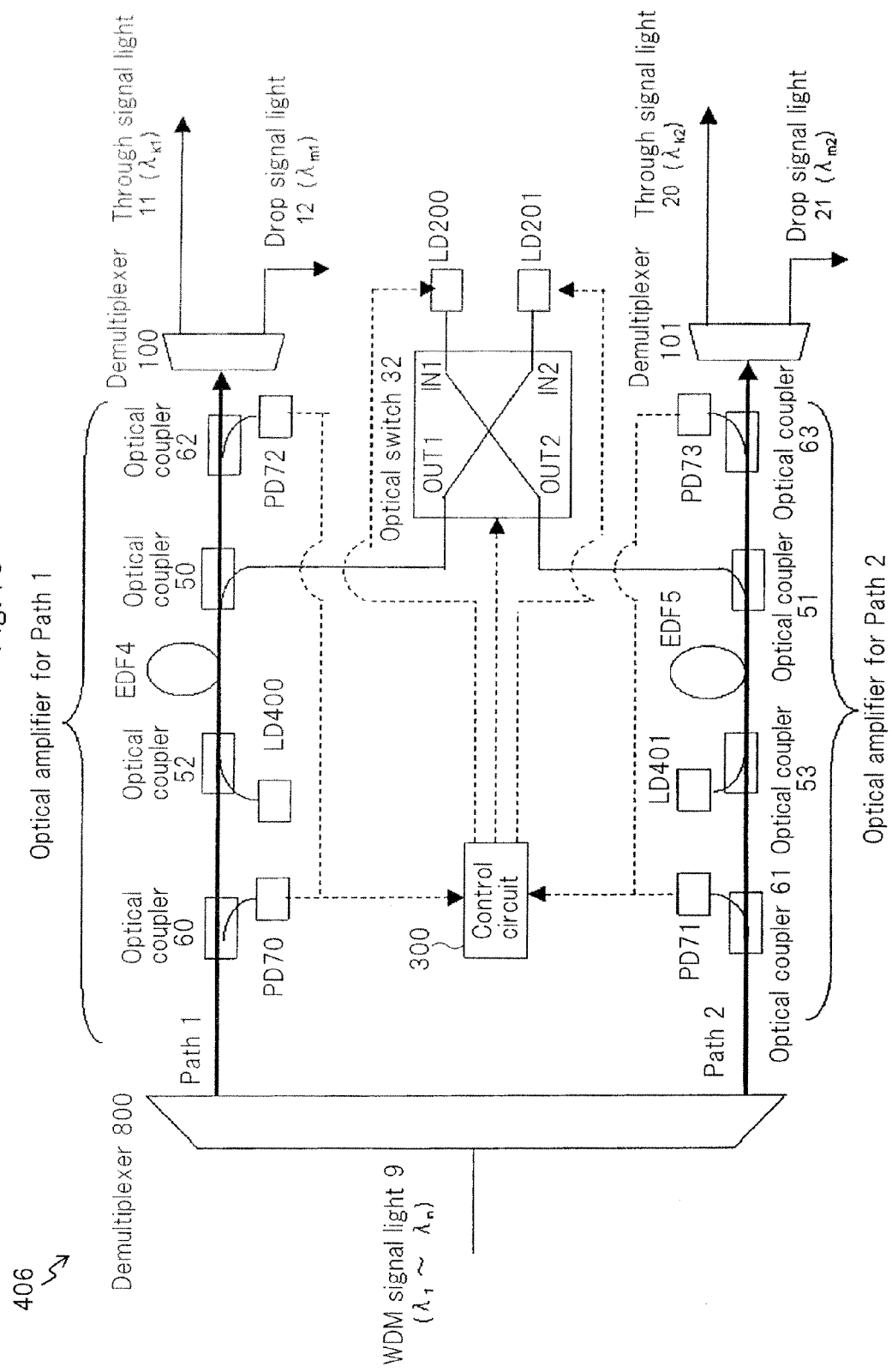
FIG. 10 is a schematic diagram describing an optical amplifier control apparatus according to the present invention.

FIG. 10 is a schematic diagram describing optical amplifier control apparatus 406 according to embodiment 6. Optical amplifier control apparatus 406 is different from optical amplifier control apparatus 402 shown in FIG. 5 in that LD 400 and 401 that input excitation light and couplers 52 and 53 are also located on the upstream side of EDFs 4 and 5. In other words, the configuration shown in FIG. 5 can be combined with the configuration shown in FIG. 2. As shown in FIG. 10, when LDs 400, 401, 200, and 201 are located on the upstream and downstream sides of EDFs 4 and 5. LDs 400 and 401 on the upstream side can be controlled as described with reference to FIG. 2 and LDs 200 and 201 on the downstream side can be controlled as described with reference to FIG. 5. Alternatively, the LDs on the upstream side can be controlled as described with reference to FIG. 5 and the LDs on the downstream side can be controlled as described with reference to FIG. 2.

Embodiment 7

Effect 9

Figure 11:
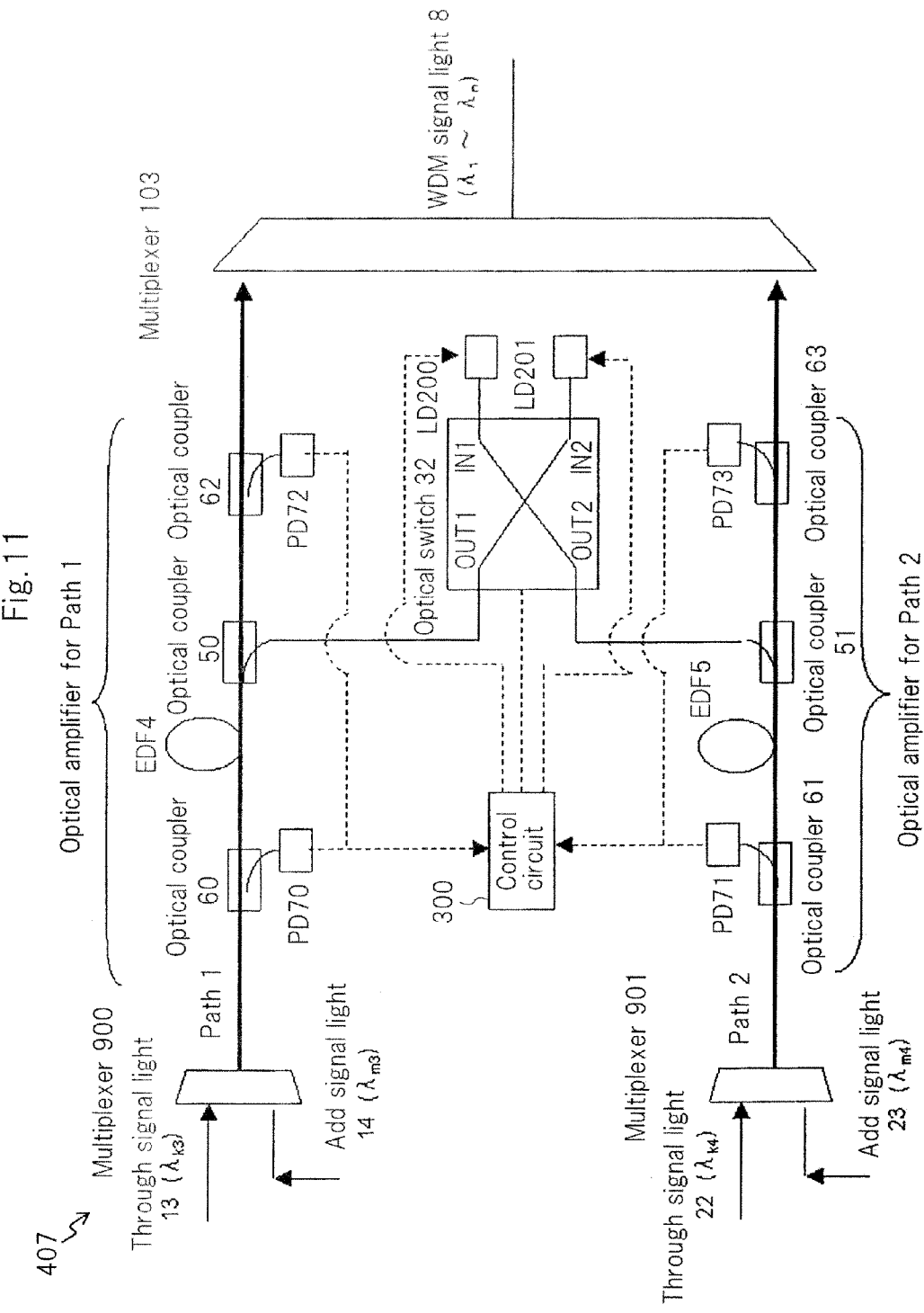
FIG. 11 is a schematic diagram describing an optical amplifier control apparatus according to the present invention.

FIG. 11 is a schematic diagram describing optical amplifier control apparatus 407 according to embodiment 7. Optical amplifier control apparatus 407 is different from optical amplifier control apparatus 402 in a configuration that multiplexes wavelength lights instead of a configuration that demultiplexes WDM signal light. Through signal light 13 and add signal light 14 are multiplexed by multiplexer 900, the multiplexed light propagates to path 1, and then the multiplexed light is optically amplified as described with reference to FIG. 5. Through signal light 22 and add signal light 23 are multiplexed by multiplexer 901, the multiplexed light propagates to path 2, and then the multiplexed light is optically amplified as described with reference to FIG. 5. Multiplexer 103 multiplexes optically amplified wavelength lights and outputs WDM signal light 8.

Embodiment 8

Figure 12:
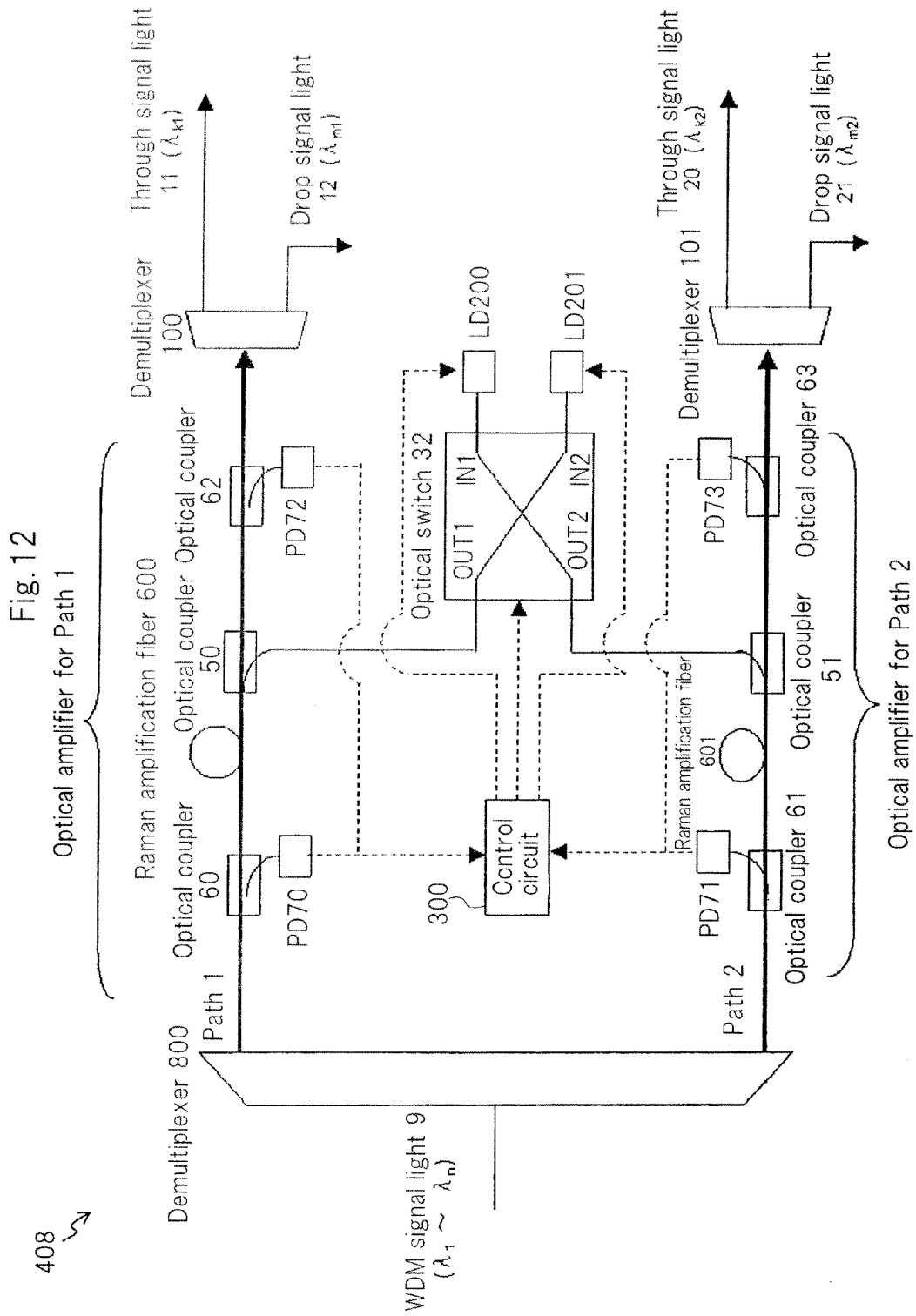
FIG. 12 is a schematic diagram describing an optical amplifier control apparatus according to the present invention.

FIG. 12 is a schematic diagram describing optical amplifier control apparatus 408 according to embodiment 8. Optical amplifier control apparatus 408 is different from optical amplifier control apparatus 402 in that Raman amplification fibers 600 and 601 that perform Raman amplification are used instead of EDFs 4 and 5. Optical amplifier control apparatus 408 can obtain Effect 1, Effect 2, Effect 3, Effect 4, Effect 7, Effect 8, and Effect 9.

Embodiment 9

Figure 13:
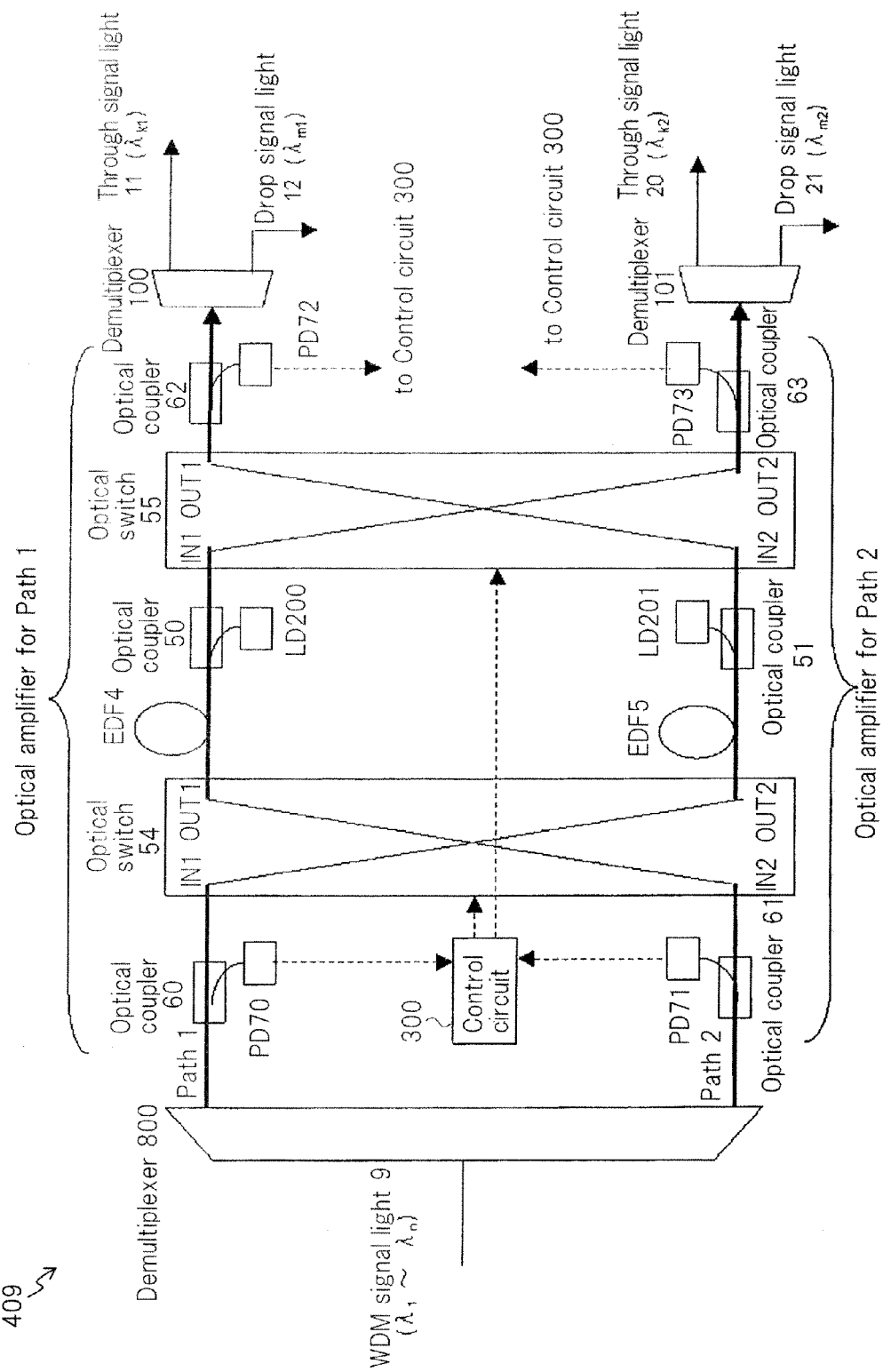
FIG. 13 is a schematic diagram describing an optical amplifier control apparatus according to the present invention.

FIG. 13 is a schematic diagram describing optical amplifier control apparatus 409 according to embodiment 9. Optical amplifier control apparatus 409 is different from optical amplifier control apparatus 402 in that routes of wavelength lights on paths are changed over, not routes of excitation lights that are output from LDs. The minimal configurational components of optical amplifier control apparatus 409 are control circuit 300, LDs 200 and 201 that output excitation lights that differ in light intensity, EDFs 4 and 5 that input excitation lights, and optical switches 54 and 55 that change optical routes of wavelength lights on paths based on the determination of control circuit 300 and input the wavelength lights to EDFs 4 and 5. FIG. 13 concretely describes optical amplifier control apparatus 402 and thereby shows not only the minimal configurational components but also other components. In optical amplifier control apparatus 409, EDFs and LDs are located in pairs, control circuit 300 determines which EDF optically amplifies wavelength lights corresponding to the number of wavelength lights on the paths, and the EDFs are changed over using optical switches 54 and 55.

Figure 14:
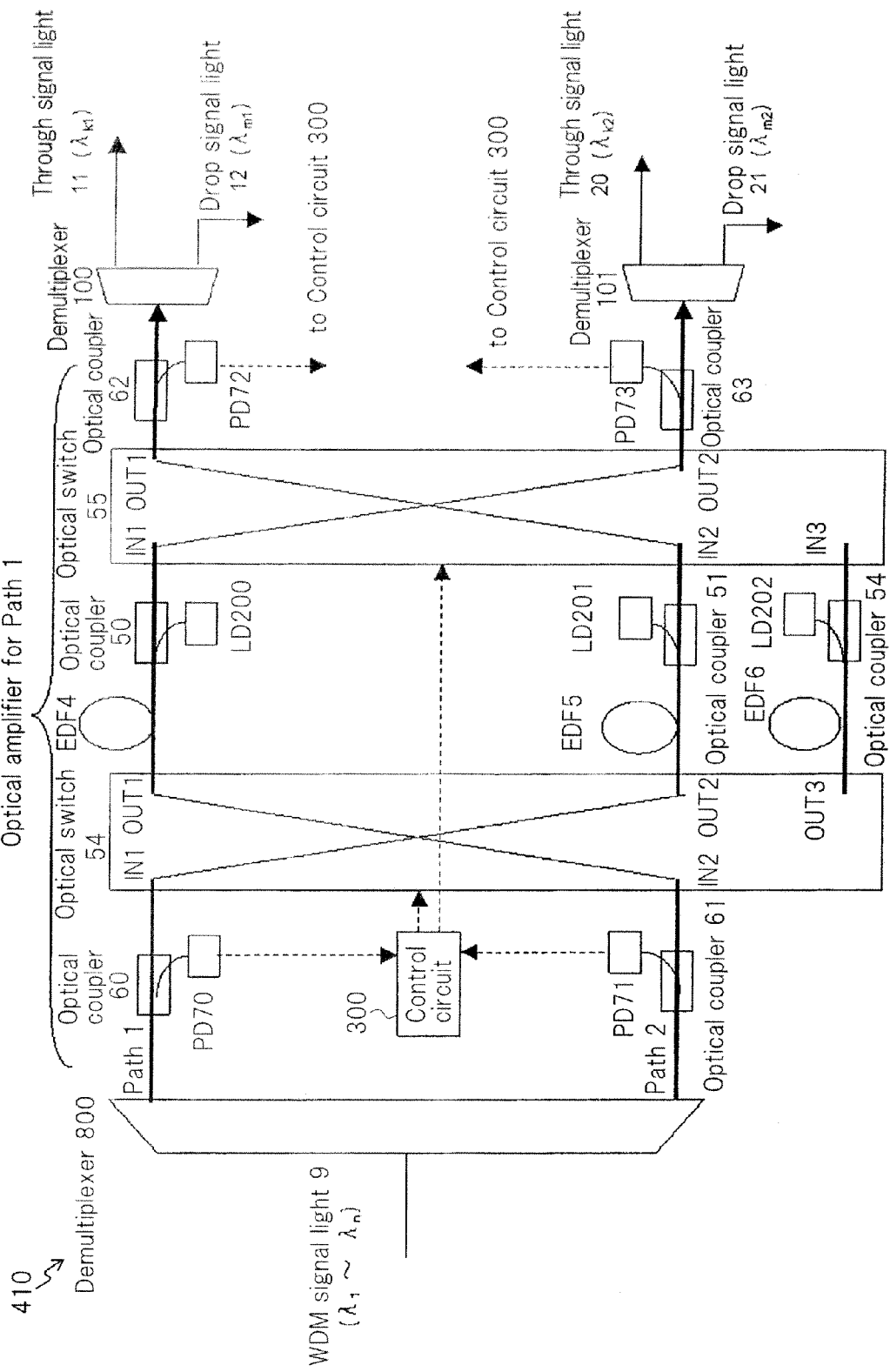
FIG. 14 is a schematic diagram describing an optical amplifier control apparatus according to the present invention.

Optical amplifier control apparatus 409 can obtain Effect 1, Effect 2, Effect 4, Effect 5, Effect 7, Effect 8, and Effect 9. However, to obtain Effect 7, not only backup LD 202, but EDF 6 and optical coupler 54 need to be provided as shown in FIG. 14. Alternatively, as shown in FIG. 15, an amplification method could be changed using Raman amplification fiber 602 instead of EDF 6.

Embodiment 10

FIG. 16 is a schematic diagram describing optical amplifier control apparatus 412 according to embodiment 10. Optical amplifier control apparatus 412 is different from optical amplifier control apparatus 409 shown in FIG. 13 in that Raman amplification fibers 600 and 601 are used instead of EDFs 4 and 5. Optical amplifier control apparatus 412 can obtain Effect 1, Effect 2, Effect 4, Effect 7, Effect 8, and Effect 9. With respect to effect 7, if wavelength light does not need to be amplified because of large input levels (the loss of amplification fiber is equal to the loss of the Raman gain, etc), by changing an optical route of wavelength light on a path to a route connected only to fiber 71, the power consumption of the LDs can be also reduced.

Other Embodiments

In the foregoing embodiments, although optical amplifiers were described as EDFs or Raman amplification fibers, as long as they are mediums that can amplify light, the same effects can be obtained.

While the invention has been particularly shown and described with reference to exemplary embodiments thereof the invention is not limited to these embodiments. It will be understood by those of ordinary skill in the art that various changes in form and details may be made therein without departing from the spirit and scope of the present invention as defined by the claims.

What is claimed is:

1. A control circuit, comprising:
a determination section that determines which paths to allocate which excitation lights that differ in light intensity based on a parameter that relates to a number of wavelengths of wavelength lights on a plurality of paths when said wavelength lights of Wavelength Division Multiplexing (WDM) signal light that propagate to one of said plurality of paths are optically amplified.

2. The control circuit as set forth in claim 1,
wherein at least one of said excitation lights has light intensity that allows all wavelengths contained in said WDM signal light to be optically amplified.

3. The control circuit as set forth in claim 1,
wherein said determination section determines to use a backup excitation light of said excitation light if said excitation lights have not reached light intensity necessary to optically amplify said wavelength lights on said path.

4. The control circuit as set forth in claim 3,
wherein said backup excitation light has light intensity that allows all wavelengths contained in said WDM signal light to be optically amplified.

5. An optical amplifier control apparatus, comprising:
a control circuit as set forth in claim 1;
optical amplifiers respectively located on said paths;
a plurality of light sources that output said excitation lights that differ in light intensity; and
an optical switch that changes optical routes of said excitation lights that are output from said light sources and inputs the excitation lights to said optical amplifiers in accordance with a judgment of said control circuit.

6. The optical amplifier control apparatus as set forth in claim 5,
wherein said optical amplifiers comprise erbium-doped fibers (EDFs).

7. The optical amplifier control apparatus as set forth in claim 5,
wherein said optical amplifiers comprise Raman amplification fibers.

8. An optical amplifier control method, comprising:
determining which paths to allocate which excitation lights that differ in light intensity based on a parameter that relates to a number of wavelengths of wavelength lights on a plurality of paths when said wavelength lights of Wavelength Division Multiplexing (WDM) signal light that propagate to one of said plurality of paths are optically amplified.

9. The control circuit as set forth in claim 1, wherein the parameter that relates to the number of wavelengths of the wavelength lights on the plurality of paths is obtained for each path.

10. The optical amplifier control apparatus as set forth in claim 5, wherein the optical switch changes the optical routes of said excitation lights based on a result of the determination section.

11. The optical amplifier control apparatus as set forth in claim 5, wherein a first light source of the plurality of light sources is selected by the switch when the number of wavelengths of wavelength lights is equal to or greater than half of said wavelength lights of the WDM signal light, and
wherein a second light source of the plurality of light sources is selected when the first light source is not selected.

12. The optical amplifier control apparatus as set forth in claim 6, wherein a first light source of the plurality of light sources is located on an upstream side of the optical amplifiers, and
wherein a second light source of the plurality of light sources is located on a downstream side of the optical amplifiers.

13. The optical amplifier control apparatus as set forth in claim 5, wherein n optical amplifiers are located to n paths, wherein n is an integer.

14. The optical amplifier control apparatus as set forth in claim 5, wherein there is a one-to-one correspondence between a number of said optical amplifiers and a number of said paths.

15. The optical amplifier control apparatus as set forth in claim 5, wherein each of the paths is provided with the excitation light of an optical amplifier.

* * * * *